Patented Jan. 23, 1923.

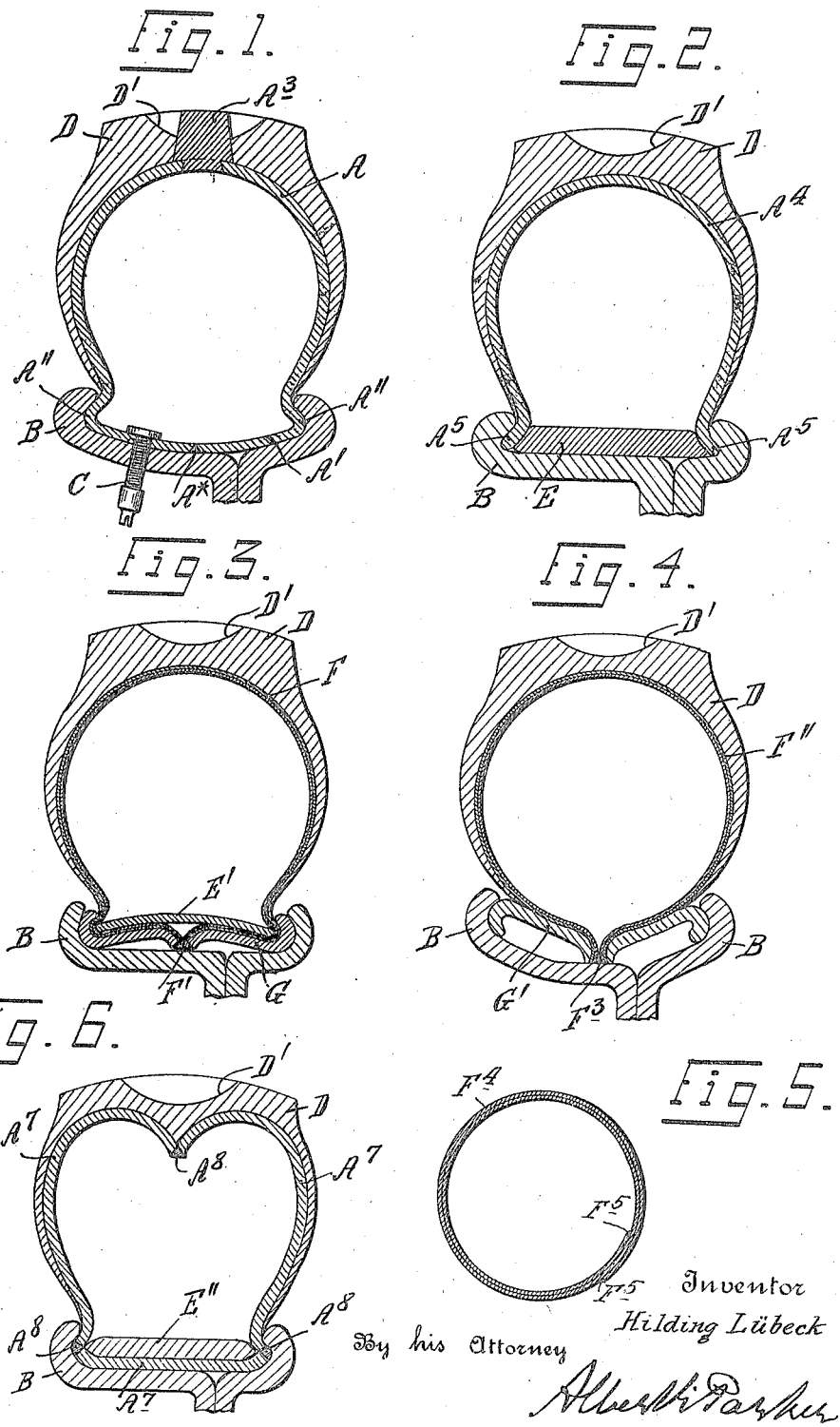

1,443,080

UNITED STATES PATENT OFFICE.

HILDING LÜBECK, OF HERSERUD, SWEDEN.

TIRE FOR AUTOMOBILES AND OTHER VEHICLES.

Application filed January 20, 1919. Serial No. 272,175.

*To all whom it may concern:*

Be it known that HILDING LÜBECK, a subject of the King of Sweden, residing at Herserud, Sweden (at present residing at the Biltmore Hotel, Madison Ave. and 43rd St., New York city, New York), has invented certain new and useful Improvements in Tires for Automobiles and Other Vehicles, of which the following is a specification.

This invention relates to tires for automobiles and other vehicles, and has for its object to provide an article of this class which will be light, reliable and punctureproof, and which will maintain its wearing qualities throughout.

My new tire has been designed especially as a substitute for solid rubber tires, one of its advantages over such tires being its greater resiliency. This resiliency will not equal that of pneumatic tires, but in a good many cases where low cost and reliability are more important than comfort, it may also be used to advantage as a substitute for pneumatic tires.

In the accompanying drawings, forming part of this specification, I have shown several examples of tires constructed in accordance with my invention. In all the forms shown, the tire consists substantially of a hollow tire body or tire tube formed preferably of metal; if desired, a covering preferably made of rubber may be used with this metal tire. In these drawings, Fig. 1 is a cross section through one form of tire, in which the body member is a closed tube;

Fig. 2 is a similar view of a tire in which the body member is open along its inner circumferential portion;

Figs. 3 and 4 show two forms of tire in which the body member is a closed tube formed of several layers of sheet metal;

Fig. 5 is a section through a band of metal wound into several layers, but before it is formed into a tubular body, and illustrates a step in the manufacture of a tire such as shown in Figs. 3 and 4 by winding a thin band of metal into several layers; and Fig. 6 shows still another form of body member.

The tire shown in Fig. 1 comprises a tubular tire body preferably made of elastic material such as steel or other suitable metal. This tire body can be constructed strong enough to carry the weight of the vehicle, without permanent deformation, or it can be made of thinner material and in this case filled with compressed air or other medium under pressure, to prevent permanent deformation. This tubular body consists of an outer portion A of substantially circular curvature in cross section, joined by an inner portion A′ curved so as to fit the rim B of the wheel. The wheel rim is adapted to engage projections or ears A″ formed at the junction of the two tube portions A, A′, and thus will hold the tire securely in place. The body or tube A, A′ is preferably closed by welding, as indicated at A*, so as to be airtight, and may be provided with a suitable air valve C for the purpose of filling the tube with compressed air or other medium, as stated above. The tube A, A′ is preferably formed by shaping an elongated piece or band of flat sheet metal first into a ring of approximately the diameter of the tire, and then into tubular form, so that the longitudinal edges of said band will abut against each other; these edges are thereupon preferably secured together, as by welding, or otherwise. The outer tube portion A may be provided at its outer periphery with inserts $A^3$ forming outward projections adapted to engage the ground and thus prevent skidding. If desired, the welding of the tube A, A′ may be done along one or both of the projecting edges A″.

To the outer surface of the tube portion A is secured, as for instance by vulcanizing, a protecting cover D, preferably made of rubber, which will form the tread member of the tire. It is of course not absolutely necessary that the cover D be secured to the body A, as by vulcanizing or otherwise, although this may be preferred in practice. The outer surface of the cover D is preferably formed with recesses or depressions D′ for the purpose of preventing skidding.

The form of my invention shown in Fig. 2 differs from that just described in that the tire body is open along its inner periphery and consists only of the outer member $A^4$ having its free edges $A^5$ engaged by the wheel rim. To prevent the edges $A^5$ from being pressed toward each other, I may insert a reinforcing ring E between them. This ring, which may be termed an auxiliary rim, closes the open inner side of the tire body $A^4$, and if the joint between the ring E and the edges A⁵ is made air-tight, an inflatable air-chamber of substantially the same character as in Fig. 1 is obtained.

Instead of forming my tire of relatively thick sheet metal, as in Fig. 1, I may use several layers of thin sheet metal, the tire in this case being formed in the same manner as in Fig. 1. Thus, in Fig. 3, I have shown a tire body suitably made of several separate layers of thin sheet metal F, welded into a tube at F'. To reinforce this tube, I may insert before welding a ring E' engaging the inner portion facing toward the rim, and to the outside of this tube portion I may secure an auxiliary rim G, consisting preferably of two parts welded together by the same operation which welds the tube F. As shown, the auxiliary rim G would then be engaged and clamped in place by the wheel rim B. The cover or tread member D may be similar to the one shown in Figs. 1 and 2, and would be secured to the outermost layer of the tube F.

Fig. 4 illustrates a modification of the construction shown in Fig. 3. The tire tube F'' in this case is also formed of several separate layers of thin sheet metal, but it is almost circular in cross section, its two edges being welded together at F³. The auxiliary rim G' in this case also may consist of two portions welded together with the tube joint F³.

The form of my invention shown in Figs. 3 and 4 may be used preferably where greater resiliency is desired. It is to be understood that in this case also the tube may be provided with a suitable valve for the same purpose as described in connection with Fig. 1. The filling of the tube with compressed air or the like will increase the resiliency and prevent permanent deformation of the tire. In the forms of my invention described so far, where the tire tube is formed of one or several separate layers of sheet metal, the short, transverse edges of the strip of material (after the latter has been given the shape of a tire) are either brought into abutment, or caused to overlap. In either case the joints are closed, as by welding or otherwise.

Instead of forming the tire body from separate layers of sheet metal, as shown in Figs. 3 and 4, the tire body may be made by winding a thin band of metal in several layers, so as to form a complete ring F⁴, as shown in Fig. 5, which ring is then formed into a tubular body, with its longitudinal edges welded together as in Figs. 1, 3, and 4. The transverse overlapping joints are also preferably welded, as shown at F⁵, and the tire may be secured to an auxiliary rim, as in Figs. 3 and 4.

Still another form of my invention is shown in Fig. 6, the tire body in this case being made of three pieces A⁷, welded together at the three points A⁸, a reinforcing ring E'' being preferably inserted before welding.

Inasmuch as one of the chief purposes of my invention is to provide tires which will cost considerably less than either the solid or the pneumatic rubber tires now commonly in use, the rubber covering of my new tire may be made relatively thin, thus requiring much less material than solid or pneumatic rubber tires. In fact, the cover may be made quite thin at the bottom of the recesses D', this being an additional advantage, since the tire will then present during its whole life, that is, until the covering is practically worn down, a surface which will effectively prevent skidding. After the covering has been worn down, the same tire body may be provided with a new covering, and this may be repeated several times without requiring a new tire body. It is evident that a thin covering will have a relatively short life, but owing to the reduced quantity of rubber material used, the cost of the tire will also be correspondingly reduced, but since such tires with thin covering will have the properties and the appearance of new tires until the covering is almost entirely worn down, it may also be advantageous from this point of view to use tires with a thin covering of relatively low cost.

It is of course possible to use my tires without any covering at all, for instance in winter, or with only a very thin cover as a protection against rust. In this case the tube would preferably have to be provided with metal knobs or projections, such as shown in Fig. 1, to prevent skidding. While I have shown such metal projections only in Fig. 1, it is clear that they may be used with any one of the forms of my invention illustrated in the drawings.

It is to be understood that the forms shown in the drawings represent a few examples only of many different forms which may be used, and that various modifications may be made without departing from the nature of my invention as set forth in the appended claim.

I claim as my invention:

In combination with a vehicle wheel rim having a flange on each side, a vehicle wheel tire made of flat elongated sheet metal shaped into a substantially tubular body having projections located between said rim flanges, and an auxiliary rim on said tubular body extending from one of said projections to the other.

In testimony whereof I affix my signature in presence of two witnesses.

HILDING LÜBECK.

Witnesses:
ALBERT E. PARKER,
HELEN LORIA.